United States Patent
Li et al.

(10) Patent No.: US 12,099,187 B2
(45) Date of Patent: Sep. 24, 2024

(54) AR OPTICAL SYSTEM AND AR DISPLAY DEVICE

(71) Applicants: Beijing BOE Optoelectronics Technology Co., Ltd., Beijing (CN); BOE Technology Group Co., Ltd., Beijing (CN)

(72) Inventors: Ke Li, Beijing (CN); Yulong Wu, Beijing (CN); Ruijun Dong, Beijing (CN); Yali Liu, Beijing (CN); Chenru Wang, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 563 days.

(21) Appl. No.: 17/424,506

(22) PCT Filed: Jan. 11, 2021

(86) PCT No.: PCT/CN2021/071039
§ 371 (c)(1),
(2) Date: Jul. 21, 2021

(87) PCT Pub. No.: WO2021/179786
PCT Pub. Date: Sep. 16, 2021

(65) Prior Publication Data
US 2022/0317448 A1   Oct. 6, 2022

(30) Foreign Application Priority Data
Mar. 12, 2020   (CN) .......................... 202010172569.1

(51) Int. Cl.
*G02B 27/01* (2006.01)
*G02B 3/00* (2006.01)
(Continued)

(52) U.S. Cl.
CPC ....... *G02B 27/0172* (2013.01); *G02B 3/0075* (2013.01); *G02B 27/026* (2013.01);
(Continued)

(58) Field of Classification Search
None
See application file for complete search history.

(56) References Cited

U.S. PATENT DOCUMENTS

| | | | |
|---|---|---|---|
| 2011/0199763 A1 | 8/2011 | Hsu et al. | |
| 2019/0094545 A1* | 3/2019 | Lo | G02B 27/0172 |
| 2019/0170906 A1* | 6/2019 | Hatakeyama | G02B 1/118 |
| 2019/0317320 A1* | 10/2019 | Park | G02B 27/144 |
| 2021/0018955 A1 | 1/2021 | Ciou et al. | |

FOREIGN PATENT DOCUMENTS

| | | |
|---|---|---|
| CN | 102053377 A | 5/2011 |
| CN | 108761794 A | 11/2018 |

(Continued)

OTHER PUBLICATIONS

International Search Report for PCT/CN2021/071039 Mailed Mar. 26, 2021.
(Continued)

*Primary Examiner* — Bao-Luan Q Le
*Assistant Examiner* — Danell L Owens
(74) *Attorney, Agent, or Firm* — Ling Wu; Stephen Yang; Ling and Yang Intellectual Property

(57) ABSTRACT

An AR optical system includes a depth-of-field separation structure corresponding to an image source, configured to convert light rays emitted from the image source into a plurality of light beams with different depths of field; a convergent lens located on an emergent light path of the depth-of-field separation structure, and configured to receive and shape the plurality of light beams with different depths of field; a first semi-transmitting semi-reflecting mirror located on a side, away from the depth-of-field separation structure, of the convergent lens, and configured to reflect
(Continued)

the plurality of shaped light beams with different depths of field towards a set direction; a concave mirror having a preset transmission-reflection ratio configured to reflect and converge the plurality of light beams with different depths of field and then make the light beam incident to a set observation position after passing through the first semi-transmitting semi-reflecting mirror.

10 Claims, 2 Drawing Sheets

(51) Int. Cl.
    *G02B 27/02*     (2006.01)
    *G02B 27/09*     (2006.01)
    *G02B 27/40*     (2006.01)
    *G06T 19/00*     (2011.01)

(52) U.S. Cl.
    CPC ......... *G02B 27/0905* (2013.01); *G02B 27/40* (2013.01); *G06T 19/006* (2013.01); *G02B 2027/0127* (2013.01); *G02B 2027/013* (2013.01); *G02B 2027/0185* (2013.01)

(56) References Cited

FOREIGN PATENT DOCUMENTS

| | | |
|---|---|---|
| CN | 108803026 A | 11/2018 |
| CN | 208421423 U | 1/2019 |
| CN | 109581678 A | 4/2019 |
| CN | 110095870 A | 8/2019 |
| CN | 110208951 A | 9/2019 |
| CN | 110727111 A | 1/2020 |
| CN | 111338081 A | 6/2020 |
| CN | 111610636 A * | 9/2020 |
| TW | 201128225 A | 8/2011 |

OTHER PUBLICATIONS

Office Action dated Feb. 20, 2021 for Chinese Patent Application No. 202010172569.1 and English Translation.
Office Action dated Jul. 22, 2021 for Chinese Patent Application No. 202010172569.1 and English Translation.
Decision of Rejection dated Oct. 18, 2021 for Chinese Patent Application No. 202010172569.1 and English Translation.
Hua Shen et al., The Selected Books of the Juvenile Encyclopedia, Aug. 31, 1989, pp. 40-42.

* cited by examiner

AR OPTICAL SYSTEM AND AR DISPLAY DEVICE

CROSS-REFERENCE TO RELATED APPLICATIONS

The present application is a U.S. National Phase Entry of International Application No. PCT/CN2021/071039 having an international filing date of Jan. 11, 2021, which claims priority to Chinese patent application No. 202010172569.1 filed to CNIPA on Mar. 12, 2020, titled "AR Optical System and AR Display Device". The entire contents of the above-identified applications are hereby incorporated by reference.

TECHNICAL FIELD

The present disclosure relates to, but is not limited to, the technical field of Augmented Reality (AR). In particular, the present disclosure relates to an AR optical system and an AR display device.

BACKGROUND

Augmented Reality (AR) is also known as hybrid reality, and the principle thereof is applying virtual information to the real world via computer technologies so that the real environment and virtual objects are superimposed on the same picture or space in real time to coexist. At present, people can interact with the real world via wearable devices, such as AR glasses or AR helmets.

Normally, when an object is viewed by human eyes, an angle between lines of sight of the two eyes has a proportional relationship with the focusing depth of the single eye. If this relationship is broken, a person may feel eye discomfort, and even have symptoms of dizziness and nausea. This phenomenon is referred to as vergence-accommodation conflict.

In the conventional AR glasses or AR helmets, a display screen creates a three-dimensional feeling via binocular parallax. However, since the distance between the display screen corresponding to the two eyes and the human eyes remains unchanged, when three-dimensional images of different depths are viewed, the focusing depth of the single eye is always the same plane, which is inconsistent with the rotation angle of the two eyes, resulting in the symptom of dizziness after long-term use, and in severe cases, resulting in symptoms such as strabismus and amblyopia of the two eyes.

SUMMARY

The following is a brief description of the subject matter described in detail in the present disclosure. This brief description is not intended to limit the scope of protection of the claims.

In a first aspect, an embodiment of the present disclosure provides an Augmented Reality (AR) optical system, comprising:
  a depth-of-field separation structure corresponding to an image source, the depth-of-field separation structure configured to convert a light ray emitted from the image source into a plurality of light beams with different depths of field;
  a convergent lens located on an emergent light path of the depth-of-field separation structure and configured to receive and shape the plurality of light beams with different depths of field;
  a first semi-transmitting semi-reflecting mirror located on a side of the convergent lens away from the depth-of-field separation structure and configured to reflect the plurality of shaped light beams with different depths of field towards a specified direction; and
  a concave mirror having a preset transmission-reflection ratio and located on a side of the first semi-transmitting semi-reflecting mirror in the reflection emergent light direction, the concave mirror having a concave surface facing the first semi-transmitting semi-reflecting mirror and configured to reflect and converge the plurality of light beams with different depths of field so that the light beams are incident to a specified observation position after passing through the first semi-transmitting semi-reflecting mirror.

In an exemplary implementation, the depth-of-field separation structure comprises a transmitting-reflecting mirror assembly, the transmitting-reflecting mirror assembly comprising a plurality of semi-transmitting semi-reflecting mirror units having a preset transmission-reflection ratio, the plurality of semi-transmitting semi-reflecting mirror units arranged at intervals for respectively corresponding to the image sources with different object distances;

in the plurality of semi-transmitting semi-reflecting mirror units, emergent light paths of at least a part of the plurality of semi-transmitting semi-reflecting mirror units face an incident light surface of the convergent lens (5); emergent light paths of the other part of the semi-transmitting semi-reflecting mirror units not facing the incident light surface of the convergent lens (5) are transmitted and/or reflected by other semi-transmitting semi-reflecting mirror units and then face the incident light surface of the convergent lens; and the plurality of semi-transmitting semi-reflecting mirror units are configured to respectively reflect and/or transmit light rays emitted from respective corresponding image sources to form the plurality of light beams with different depths of field incident to the convergent lens.

In an exemplary implementation, the semi-transmitting semi-reflecting mirror unit closest to the convergent lens is a first semi-transmitting semi-reflecting mirror unit, and the semi-transmitting semi-reflecting mirror unit farthest from the convergent lens is a second semi-transmitting semi-reflecting mirror unit; the semi-transmitting semi-reflecting mirror units located between the first semi-transmitting semi-reflecting mirror unit and the second semi-transmitting semi-reflecting mirror unit are all third semi-transmitting semi-reflecting mirror units;

the second semi-transmitting semi-reflecting mirror unit is configured to reflect a second light ray of a corresponding second image source, such that the second light ray is reflected to the incident light surface of the convergent lens by the first semi-transmitting semi-reflecting mirror unit after passing through the third semi-transmitting semi-reflecting mirror units;

the N-th third semi-transmitting semi-reflecting mirror unit is further configured to reflect a third light ray of a corresponding third image source, such that the third light ray is reflected to the incident light surface of the convergent lens by the first semi-transmitting semi-reflecting mirror unit, or such that the third light ray is reflected to the incident light surface of the convergent lens by the first semi-transmitting semi-reflecting mirror unit after passing through the (N−1)-th to 1st third semi-transmitting semi-reflecting mirror units, wherein N is a positive integer; the third semi-transmitting semi-reflecting mirror unit closest to the first semi-transmitting semi-reflecting mirror unit is the 1st third semi-transmitting semi-reflecting mirror unit; and the first semi-transmitting semi-reflecting mirror unit is further configured to transmit a first light ray of a corresponding first image source to the incident light surface of the convergent lens.

In an exemplary implementation, the semi-transmitting semi-reflecting mirror unit close to the convergent lens is a first semi-transmitting semi-reflecting mirror unit, and the semi-transmitting semi-reflecting mirror unit away from the convergent lens is a second semi-transmitting semi-reflecting mirror unit;

the second semi-transmitting semi-reflecting mirror unit is configured to reflect a second light ray of a corresponding second image source, such that the second light ray is reflected to the incident light surface of the convergent lens by the first semi-transmitting semi-reflecting mirror unit; and the first semi-transmitting semi-reflecting mirror unit is further configured to transmit a first light ray of a corresponding first image source to the incident light surface of the convergent lens.

In an exemplary implementation, the plurality of semi-transmitting semi-reflecting mirror units are at least one of a plane mirror, a concave mirror, or a convex mirror; and/or the first semi-transmitting semi-reflecting mirror is one of a plane mirror, a concave mirror, or a convex mirror.

In an exemplary implementation, there are three semi-transmitting semi-reflecting mirror units.

In an exemplary implementation, the depth-of-field separation structure is a micro-lens array, the micro-lens array arranged in parallel with the convergent lens; and the micro-lens array is configured to receive the light ray emitted from the image source and form and emit the plurality of light beams with different depths of field.

In an exemplary implementation, the convergent lens at least comprises an aspheric lens; and/or the surface of the convergent lens is coated with an anti-reflection film.

In an exemplary implementation, a main optical axis of the concave mirror intersects a main optical axis of the convergent lens at the first semi-transmitting semi-reflecting mirror.

In a second aspect, an embodiment of the present disclosure provides an Augmented Reality (AR) display device, comprising an image source and the AR optical system according to the first aspect, wherein a depth-of-field separation structure in the AR optical system is disposed in correspondence with the image source.

In an exemplary implementation, the AR display device further comprises an optical system frame, wherein the AR optical system is fixed on the optical system frame; and/or the AR optical system and the image source are both fixed on the optical system frame.

Additional aspects and advantages of the present disclosure are partially provided in the following description, and become apparent due to the following description or are learned from the practice of the present disclosure.

BRIEF DESCRIPTION OF DRAWINGS

The above and/or additional aspects and advantages of the present disclosure become apparent and easy to understand from the following description of embodiments with reference to the drawings.

DETAILED DESCRIPTION

Figure 1:
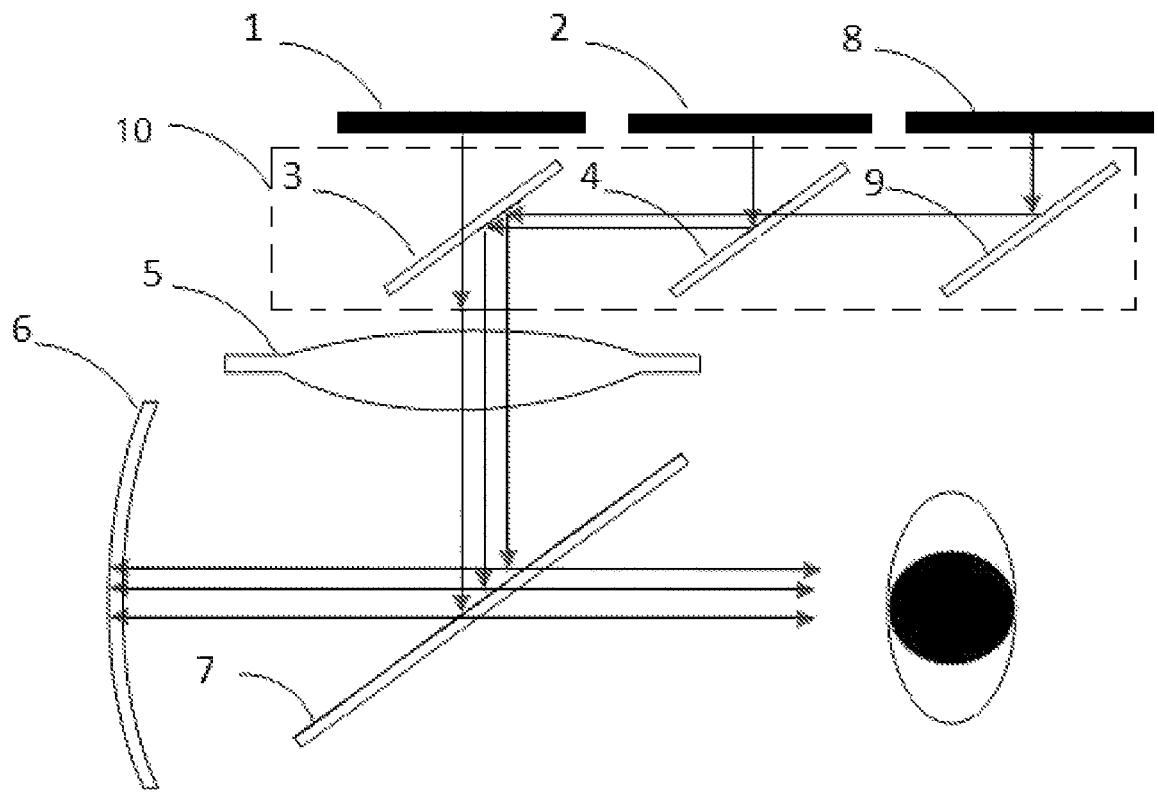
FIG. 1 is a structural schematic view of an AR optical system and a corresponding image source provided by an embodiment of the present disclosure.

The present disclosure is described in detail below, and examples of embodiments of the present disclosure are illustrated in the drawings, in which the same or similar reference signs always denote the same or similar components or components having the same or similar functions. Further, the detailed description of the known technology is omitted if it is not necessary for the illustrated features of the present disclosure. The embodiments described below with reference to the drawings are exemplary, are only for the purpose of explaining the present disclosure, and should not be interpreted as limitations to the present disclosure.

It can be understood by those skilled in the art that unless otherwise defined, all terms (including technical terms and scientific terms) used herein have the same meaning as those commonly understood by those skilled in the art to which the present disclosure belongs. It should also be understood that terms such as those defined in general dictionaries should be understood to have meanings consistent with those in the context of the prior art and will not be interpreted in idealized or over-formal terms unless specifically defined as here.

It can be understood by those skilled in the art that the singular forms "a", "one", "said", and "the" used herein may also include the plural forms unless specifically stated. It should be further understood that the wording "including" used in the description of the present disclosure refers to the presence of the features, integers, steps, operations, elements, and/or components, but does not exclude the presence or addition of one or more other features, integers, steps, operations, elements, components, and/or groups thereof. The wording "and/or" used herein includes all or any unit and all combinations of one or more associated listed items.

The technical solution of the present disclosure is described below in detail via specific embodiments.

Referring to FIG. 1, an embodiment of the present disclosure provides an Augmented Reality (AR) optical system, including a depth-of-field separation structure 10, a convergent lens 5, a first semi-transmitting semi-reflecting mirror 7, and a concave mirror 6 having a preset transmission-reflection ratio.

The depth-of-field separation structure 10 is disposed in correspondence with an image source and is configured to convert a light ray emitted from the image source into a plurality of light beams with different depths of field.

The convergent lens 5 is located on an emergent light path of the depth-of-field separation structure 10 and is configured to receive and shape the plurality of light beams with different depths of field.

The first semi-transmitting semi-reflecting mirror 7 is located on a side of the convergent lens 5 away from the depth-of-field separation structure 10 and is configured to reflect the plurality of shaped light beams with different depths of field towards a specified direction.

The concave mirror 6 is located on a side of the first semi-transmitting semi-reflecting mirror 7 in the reflection emergent light direction. The concave mirror 6 has a concave surface facing the first semi-transmitting semi-reflecting mirror 7 and is configured to reflect and converge the plurality of light beams with different depths of field so that the light beams are incident to a specified observation position after passing through the first semi-transmitting semi-reflecting mirror 7.

The AR optical system provided by this embodiment converts the light ray emitted from the image source into a plurality of light beams with different depths of field by means of the depth-of-field separation structure 10. Since the light beams with different depths of field correspond to different object distances, the image distances of different images are different, thereby forming focal planes at different distances, such that images with different depths can be seen, thus alleviating the vergence-accommodation conflict of the user in use and improving the user experience.

In an exemplary implementation, on the basis of the specific implementation structure of the depth-of-field separation structure 10, a plurality of or a single image source may be provided according to actual needs. Referring to FIG. 1, for example, the image source in this embodiment includes at least one of a first image source 1 and a second image source 8, or a first image source 1 in FIG. 1, which may also be referred to in the following embodiments.

In this embodiment, the light beams with different depths of field refers to light beams with different light path distances in the whole optical system, and each light beam refers to a set of all light rays with the same depth of field. All of the light rays are abstracted into one light beam to facilitate the description of the whole light path system.

In an exemplary implementation, for a single image source (generally a plane light source consisting of a plurality of point light sources), a light beam representing the same depth of field can represent a set of all light rays emitted from the image source or a set of some light rays emitted, and each light beam can produce an image effect of a corresponding depth. The number of the light beams may be determined according to the specific implementation structure of the depth-of-field separation structure 10, and is not specifically limited herein.

In this embodiment, in case of a plurality of light beams with different depths of field, the light rays in each light beam are divergently emitted by a plurality of point light sources in the image source, resulting in a divergence state of some light rays in the light beam, thereby reducing the imaging effect. Therefore, it is necessary to converge and shape the light rays to improve the emergent light effect. In an exemplary implementation, the convergent lens 5 is arranged on the emergent light path of the depth-of-field separation structure 10. Since the convergent lens 5 is a lens with a thicker center and a thinner edge, it has the function of converging light rays, such that the plurality of light beams with different depths of field emergent from the depth-of-field separation structure 10 can be converged and shaped, thus improving the emergent light effect.

In an exemplary implementation, in the plurality of shaped light beams with different depths of field emergent from the convergent lens 5, some ineffective light rays are directly transmitted through the first semi-transmitting semi-reflecting mirror 7, basically without affecting the propagation of the entire effective light rays. Therefore, the number of light beams reflected to the concave mirror 6 by the first semi-transmitting semi-reflecting mirror 7 may be regarded as unchanged, and only some ineffective light rays in the light beams are transmitted directly, that is, the number of the plurality of light beams with different depths of field received by the concave mirror 6 is with the same as the number of the plurality of light beams with different depths of field shaped by the convergent lens 5.

In this embodiment, the concave mirror 6 having a preset transmission-reflection ratio may be a total-reflection concave mirror 6 (that is, the transmissivity thereof is zero). The concave mirror 6 converges the light beams reflected by the first semi-transmitting semi-reflecting mirror 7, and the concave surface of the concave mirror 6 faces the first semi-transmitting semi-reflecting mirror 7 to reflect the light beams with different depths of field to a front focal point of the concave mirror 6. The light rays in the plurality of light beams with different depths of field all converge at the focal point and then become incident to a preset observation position after passing through the first semi-transmitting semi-reflecting mirror 7.

In an exemplary implementation, the concave mirror 6 may also be a lens with transmission and reflection effects to ensure that a part of the ambient light enters the AR optical system and becomes incident to the specified observation position, so as to improve the effect of fusion with a real scene. For the concave mirror 6 with the transmission and reflection effects, the overall thickness of the concave mirror 6 needs to be configured evenly to ensure the imaging effect. The specified observation position generally refers to the position of human eyes.

The image source in this embodiment may be a Liquid Crystal On Silicon (LCOS) display panel, an Organic Light Emitting Diode (OLED) display panel, or a Liquid Crystal Display (LCD) panel.

For the first semi-transmitting semi-reflecting mirror 7 in this embodiment and the semi-transmitting semi-reflecting mirror unit in subsequent embodiments, the ratio of transmission to reflection (transmission-reflection ratio for short) may be in a variety of combinations, and is not limited to the case of semi-transmission and semi-reflection (that is, the transmission-reflection ratio is 50%/50%), but also includes other cases of transmission-reflection ratios such as 30%/70% or 60%/90%. The specific transmission-reflection ratio is configured according to actual needs of the optical system, and is not specifically limited herein.

In addition, "a plurality of" in this embodiment and the following embodiments refers to "two or more than two".

On the basis of the above embodiments, the inventor of the present disclosure considers that for a plurality of image sources, it is necessary to configure corresponding transmitting-reflecting mirrors and use a combination of the transmitting-reflecting mirrors to realize different light path distances between different image sources and the convergent lens 5, so as to form light beams with different depths of field corresponding to different image sources. Therefore, the embodiment of the present disclosure provides the following exemplary implementation of the depth-of-field separation structure 10.

The depth-of-field separation structure 10 is a transmitting-reflecting mirror assembly, and the transmitting-reflecting mirror assembly includes a plurality of semi-transmitting semi-reflecting mirror units having a preset transmission-reflection ratio, wherein the plurality of the semi-transmitting semi-reflecting mirror units are arranged at intervals for respectively corresponding to image sources with different object distances.

In the plurality of semi-transmitting semi-reflecting mirror units, emergent light paths of at least a part of the plurality of semi-transmitting semi-reflecting mirror units face an incident light surface of the convergent lens 5; and emergent light paths of the other part of the semi-transmitting semi-reflecting mirror units not facing the incident light surface of the convergent lens 5 are transmitted and/or reflected by other semi-transmitting semi-reflecting mirror units and then directly face the incident light surface of the convergent lens 5.

The plurality of semi-transmitting semi-reflecting mirror units are configured to respectively reflect and/or transmit light rays emitted from respective corresponding image sources to form the plurality of light beams with different depths of field incident to the convergent lens 5.

In an exemplary implementation, in the plurality of semi-transmitting semi-reflecting mirror units, the emergent light paths of all of the semi-transmitting semi-reflecting mirror units may face the incident light surface of the convergent lens 5. For example, corresponding reflected light paths of the plurality of semi-transmitting semi-reflecting mirror units all face the incident light surface of the convergent lens 5 after reflection, while the reflected light paths of the semi-transmitting semi-reflecting mirror units at different positions may be directly incident to the incident light surface of the convergent lens 5 after the emergent light paths are transmitted by the other semi-transmitting semi-reflecting mirror units. However, the reflection emergent light paths of all of the semi-transmitting semi-reflecting mirror units are in the same direction.

In this embodiment, directly facing the incident light surface of the convergent lens 5 only indicates an emergent light direction, and does not indicate that the emergent light path of the semi-transmitting semi-reflecting mirror unit directly faces the incident light surface of the convergent lens 5. The emergent light path may be transmitted or reflected by other semi-transmitting semi-reflecting mirror units before directly incident to the incident light surface of the convergent lens.

Necessarily, there may be a case in which the emergent light paths of only a part of the semi-transmitting semi-reflecting mirror units do not face the incident light surface of the convergent lens 5. The emergent light paths of this part of semi-transmitting semi-reflecting mirror units (the semi-transmitting semi-reflecting mirror units with the emergent light paths not facing the incident light surface of the convergent lens 5) may face the incident light surface of the convergent lens 5 after transmitted or reflected by the other semi-transmitting semi-reflecting mirror units in the plurality of semi-transmitting semi-reflecting mirror units, or face the incident light surface of the convergent lens 5 after transmitted and reflected thereby.

The light rays emitted from the respective corresponding image sources may be emitted after reflected or transmitted by the plurality of semi-transmitting semi-reflecting mirror units, or after reflected and transmitted thereby (the times of reflection and transmission may be specifically configured according to actual structural needs). Due to the different object distances of the image sources, the plurality of light beams with different depths of field can be formed when the light rays reach the incident light surface of the convergent lens 5.

In this embodiment, the image sources with different object distances indicate that propagation distances of the light rays emitted from light emitting surfaces of the image sources to the incident light surface of the convergent lens 5 or the human eye observation position are different, so as to form the plurality of light beams with different depths of field via reflection or transmission.

In addition, the light paths facing the incident light surface of the convergent lens 5 in this embodiment can be incident to the convergent lens 5 and be incident to the semi-transmitting semi-reflecting mirror 7 after converged and shaped.

On the basis of the above embodiments, referring to FIG. 1, if there are three or more than three semi-transmitting semi-reflecting mirror units in the transmitting-reflecting mirror assembly, the plurality of semi-transmitting semi-reflecting mirror units are classified first. The specific classification is as follows.

The semi-transmitting semi-reflecting mirror unit closest to the convergent lens 5 is a first semi-transmitting semi-reflecting mirror unit 3, and the semi-transmitting semi-reflecting mirror unit farthest from the convergent lens 5 is a second semi-transmitting semi-reflecting mirror unit 9; the semi-transmitting semi-reflecting mirror units 4 located between the first semi-transmitting semi-reflecting mirror unit 3 and the second semi-transmitting semi-reflecting mirror unit 9 are all third semi-transmitting semi-reflecting mirror units 4.

The second semi-transmitting semi-reflecting mirror unit 9 is configured to reflect a second light ray of a corresponding second image source 8, such that the second light ray is reflected to the incident light surface of the convergent lens 5 by the first semi-transmitting semi-reflecting mirror unit 3 after passing through the third semi-transmitting semi-reflecting mirror units 4.

The number of the third semi-transmitting semi-reflecting mirror units 4 is N, wherein N is a positive integer. The N-th third semi-transmitting semi-reflecting mirror unit 4 is further configured to reflect a third light ray of a corresponding third image source 2, such that the third light ray is reflected to the incident light surface of the convergent lens 5 by the first semi-transmitting semi-reflecting mirror unit 3, or such that the third light ray is reflected to the incident light surface of the convergent lens 5 by the first semi-transmitting semi-reflecting mirror unit 3 after passing through the (N−1)-th to 1st third semi-transmitting semi-reflecting mirror units 4. In an exemplary implementation, the third semi-transmitting semi-reflecting mirror unit 4 closest to the first semi-transmitting semi-reflecting mirror unit 3 is the 1st third semi-transmitting semi-reflecting mirror unit 4.

The first semi-transmitting semi-reflecting mirror unit 3 is further configured to transmit a first light ray of a corresponding first image source 1 to the incident light surface of the convergent lens 5.

In this embodiment, the number N of the third semi-transmitting semi-reflecting mirror units 4 may be 1 or greater than 1, and is configured according to the actual needs. Each third semi-transmitting semi-reflecting mirror unit 4 corresponds to a third image source 2. In description of this embodiment and the drawings, for example, there is one third semi-transmitting semi-reflecting mirror unit 4.

A reflection emergent light direction and a transmission emergent light direction of the first semi-transmitting semi-reflecting mirror unit 3 are parallel, and both face the incident light surface of the convergent lens 5. The first semi-transmitting semi-reflecting mirror unit 3 transmits or reflects the light rays emitted from the first image source 1 to form a light beam with the same depth of field incident to the convergent lens 5. In description of this embodiment, for example, the first semi-transmitting semi-reflecting mirror unit 3 transmits the first light ray emitted from the first image source 1.

The second semi-transmitting semi-reflecting mirror unit 9 transmits or reflects the second light ray emitted from the second image source 8. In description of this embodiment, for example, the second semi-transmitting semi-reflecting mirror unit 9 performs reflection. The light beam reflected by the second semi-transmitting semi-reflecting mirror unit 9 is incident to the third semi-transmitting semi-reflecting mirror unit 4 to serve as an incident light path (which may be a transmitted or reflected incident light path) of the third semi-transmitting semi-reflecting mirror unit 4. In description of this embodiment, for example, the light beam reflected by the second semi-transmitting semi-reflecting mirror unit 9 serves as the transmitted incident light path of the third semi-transmitting semi-reflecting mirror unit 4.

Furthermore, the third semi-transmitting semi-reflecting mirror unit 4 transmits or reflects the third light ray emitted from the third image source 8. In description of this embodiment, for example, the third semi-transmitting semi-reflecting mirror unit 4 performs reflection. A reflection emergent light path of the third semi-transmitting semi-reflecting mirror unit 4 and a transmission emergent light path of the third semi-transmitting semi-reflecting mirror unit 4 are in the same direction, and both are incident to a reflection surface of the first semi-transmitting semi-reflecting mirror unit 3 to serve as reflected incident light rays of the first semi-transmitting semi-reflecting mirror unit 3. After reflected by the first semi-transmitting semi-reflecting mirror unit 3, the reflection emergent light path of the third semi-transmitting semi-reflecting mirror unit 4 and the transmission emergent light path of the third semi-transmitting semi-reflecting mirror unit 4 (equivalent to a reflection emergent light path of the second semi-transmitting semi-reflecting mirror unit 9) form two light beams with different depths of field, and converge with a light beam with the same depth of field transmitted by the first semi-transmitting semi-reflecting mirror unit 3, all of which are incident to the convergent lens 5.

Figure 2:
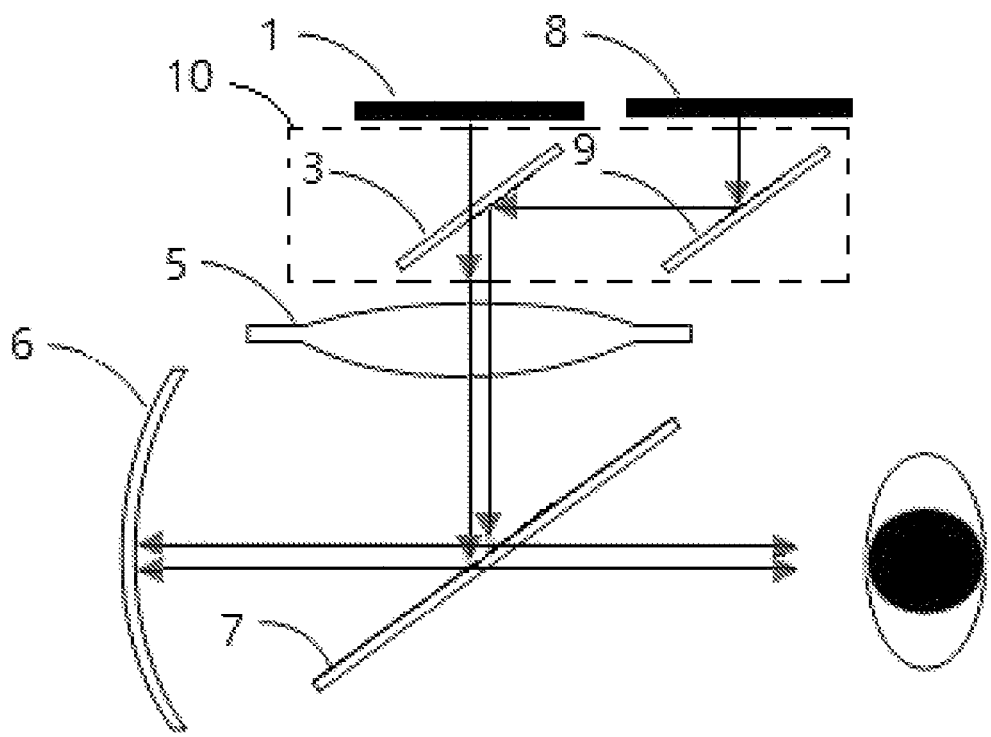
FIG. 2 is a structural schematic view of another AR optical system and a corresponding image source provided by an embodiment of the present disclosure.

In an exemplary implementation, referring to FIG. 2, if there are only two semi-transmitting semi-reflecting mirror units, the semi-transmitting semi-reflecting mirror unit close to the convergent lens 5 is a first semi-transmitting semi-reflecting mirror unit 3, and the semi-transmitting semi-reflecting mirror unit away from the convergent lens 5 is a second semi-transmitting semi-reflecting mirror unit 9. The second semi-transmitting semi-reflecting mirror unit 9 is configured to reflect a second light ray of a corresponding second image source 8, such that the second light ray is reflected to the incident light surface of the convergent lens 5 by the first semi-transmitting semi-reflecting mirror unit 3; and the first semi-transmitting semi-reflecting mirror unit 3 is further configured to transmit a first light ray of a corresponding first image source 1 to the incident light surface of the convergent lens 5.

In an exemplary implementation, the first semi-transmitting semi-reflecting mirror unit 3 directly transmits the light ray emitted from the first image source 1 to the convergent lens 5, the second semi-transmitting semi-reflecting mirror unit 9 reflects the light ray emitted from the second image source 8 to form a reflected incident light path of the first semi-transmitting semi-reflecting mirror unit 3, and a reflection emergent light ray reflected by the first semi-transmitting semi-reflecting mirror unit 3 is parallel or coincident with a transmission emergent light ray of the first semi-transmitting semi-reflecting mirror unit 3, so as to form two light beams with different depths of field incident to the convergent lens 5.

On the basis of the above embodiments, the plurality of semi-transmitting semi-reflecting mirror units are selected from at least one of a plane mirror, a concave mirror, or a convex mirror. That is, each of the semi-transmitting semi-reflecting mirror units may be a plane mirror, a concave mirror, or a convex mirror; or only one of the semi-transmitting semi-reflecting mirror units is a plane mirror and the other semi-transmitting semi-reflecting mirror units are concave mirrors. Alternatively, the first semi-transmitting semi-reflecting mirror 7 is one of a plane mirror, a concave mirror, or a convex mirror, as long as it has both transmission and reflection effects. The concave mirror or convex mirror in this embodiment refers to a lens with transmission and reflection effects. The concave and convex shapes are defined relative to a plane and refer to the shape of the surface of the semi-transmitting semi-reflecting mirror unit or the first semi-transmitting semi-reflecting mirror 7.

All of the above semi-transmitting semi-reflecting mirrors with different surface shapes may be configured with their respective transmission-reflection ratios as needed. In addition, the above examples of specific surface shapes of each semi-transmitting semi-reflecting mirror unit and the first semi-transmitting semi-reflecting mirror 7 are merely some optional modes and do not represent the enumeration of all cases.

In the above embodiments, as found by the inventor of the present disclosure, in the comprehensive consideration of the design difficulty and imaging quality of the AR optical system, the number of the semi-transmitting semi-reflecting mirror units is generally set to three, and the number of the corresponding image sources is also three, i.e., in the AR optical system illustrated in FIG. 1.

Figure 3:
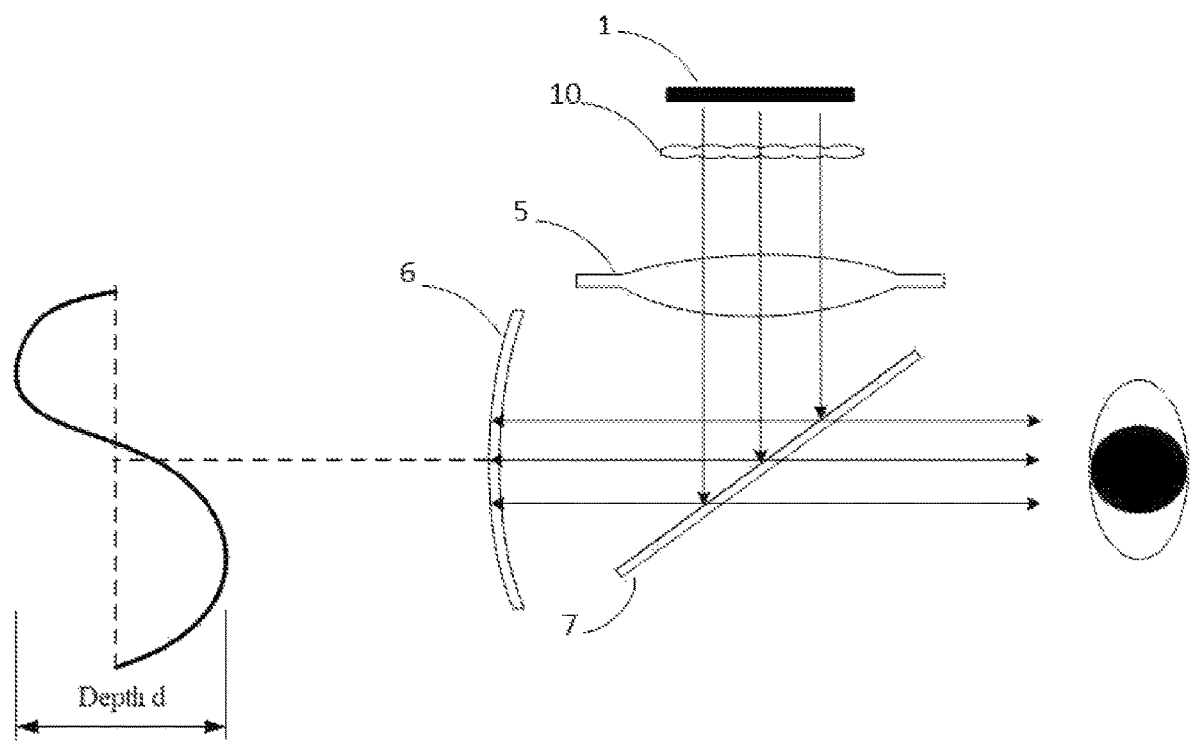
FIG. 3 is a structural schematic view of another AR optical system and a corresponding image source provided by an embodiment of the present disclosure and a schematic view of an image depth corresponding to the structure.

On the basis of the above embodiments, this embodiment further provides another depth-of-field separation structure 10, as illustrated in FIG. 3. The depth-of-field separation structure 10 is a micro-lens array, wherein the micro-lens array is disposed in parallel with the convergent lens 5, and the micro-lens array is configured to receive the light rays emitted from the image source and form a plurality of light beams with different depths of field.

The AR optical system provided by this embodiment uses the micro-lens array as the depth-of-field separation structure 10, and may convert the light rays emitted from the image source into a plurality of light beams with different depths of field by means of a plurality of micro-lens units of the micro-lens array, so as to form focal planes at different distances, such that images with different depths can be seen, thus alleviating the vergence-accommodation conflict of the user in use and improving the user experience. Moreover, the micro-lens array makes the whole AR device compact in structure and easy to be worn or carried.

In an exemplary implementation, the micro-lens array may be composed of a plurality of micro-lens units according to a specified dimension and specified arrangement spacing, and each micro-lens unit may reach the micron level. The micro-lens array is disposed in correspondence with a single image source (the first image source 1 in FIG. 3). A light wave emitted by the first image source 1 can be divided into many tiny spatial portions by the plurality of micro-lens units, and each portion is focused on the focal plane by a corresponding micro-lens unit. A plane composed of a series of focal points can be obtained via a series of micro-lens units, so as to a plurality of light beams with different depths of field.

As illustrated in FIG. 3, the plurality of light beams with different depths of field sequentially are shaped by the convergent lens 5, reflected by the first semi-transmitting semi-reflecting mirror 7, reflected and converged by the concave mirror 6, transmitted by the first semi-transmitting semi-reflecting mirror 7, and then become incident to the specified observation position, such that the human eyes can observe images with different depths d.

On the basis of the above embodiments, the convergent lens 5 provided by this embodiment of the present disclosure at least includes an aspheric lens, and the curvature radius of the aspheric lens changes continuously from the center to the edge, so as to maintain good aberration correction to obtain the required performance. The application of the aspheric lens brings excellent sharpness and higher resolution, and moreover, makes a miniaturization design of the lens possible.

In an exemplary implementation, the surface of the aspheric lens is coated with an anti-reflection film to increase the light transmittance of the convergent lens 5 and improve the imaging effect of the image.

In the above embodiments, in order to make the light rays emitted from the image source incident to the human eyes as much as possible, a main optical axis of the concave mirror 6 and a main optical axis of the convergent lens 5 are configured to intersect each other, and a intersection is located on the first semi-transmitting semi-reflecting mirror 7.

In this embodiment, the light rays emergent from the convergent lens 5 may be reflected as much as possible to the reflection surface of the concave mirror 6 close to the main optical axis by means of the above structural configuration, thus improving the image brightness.

In an exemplary implementation, the intersection of the main optical axis of the concave mirror 6 and the main optical axis of the convergent lens 5 is located at the optical center of the first semi-transmitting semi-reflecting mirror 7. In this case, the areas of the surface of the first semi-transmitting semi-reflecting mirror 7 respectively used for reflection and transmission both reach the maximums, further improving the image brightness.

On the basis of the same invention concept, an embodiment of the present disclosure further provides an AR display device, including an image source and the AR optical system in the above embodiments, wherein a depth-of-field separation structure 10 in the AR optical system is disposed in correspondence with the image source.

The AR display device provided by this embodiment includes the AR optical system including the depth-of-field separation structure 10, and converts the light rays emitted from the image source into a plurality of light beams with different depths of field by means of the depth-of-field separation structure 10. Since the light beams with different depths of field correspond to different object distances, the image distances of different images are different, thereby forming focal planes at different distances, such that images with different depths can be seen, thus alleviating the vergence-accommodation conflict of the user in use and improving the user experience.

In an exemplary implementation, the depth-of-field separation structure 10 is a transmitting-reflecting mirror assembly, and the transmitting-reflecting mirror assembly includes a plurality of semi-transmitting semi-reflecting mirror units respectively corresponding to a plurality of image sources, which can respectively reflect or transmit or reflect and transmit light rays emitted from respective corresponding image sources, before converging the light rays incident to the convergent lens 5, thus forming a plurality of light beams with different depths of field. In addition, the depth-of-field separation structure 10 may also be a micro-lens array, and the micro-lens array can convert the light rays emitted from a single image source into a plurality of light beams with different depths of field. For other structures of the AR optical system, a reference may be made to the content in the above embodiments, which will not be described in detail herein again.

On the basis of the above embodiments, the AR display device provided by this embodiment further includes an optical system frame. The AR optical system may be separately fixed on the optical system frame, so as to form, for example, AR glasses, with which light rays emitted from a front image source can be viewed. In this embodiment, the specific structure of the optical system frame may not be specifically defined, as long as the components in the AR optical system can be mounted at preset positions.

In an exemplary implementation, the AR optical system and the image source may be both fixed on the optical system frame, so as to form an AR helmet or an AR device for direct observation, for example, a corresponding image is directly viewed by human eyes in the AR device. In this embodiment, the specific structure of the optical system frame may not be specifically defined, as long as the components and image sources in the AR optical system can be mounted at preset positions.

The embodiments of the present disclosure at least have the following technical effects:
1. The light rays emitted from the image source are converted into a plurality of light beams with different depths of field by means of the depth-of-field separation structure. Since the light beams with different depths of field correspond to different object distances, the image distances of different images are different, thereby forming focal planes at different distances, such that images with different depths can be seen, thus alleviating the vergence-accommodation conflict of the user in use and improving the user experience.
2. The light rays emitted from the image sources with different image distances are transmitted or reflected or transmitted and reflected by means of the transmitting-reflecting lens assembly, to separately form light beams with different depths of field, so that different images have different depths.
3. The micro-lens array is used as the depth-of-field separation structure, and the plurality of micro-lens units of the micro-lens array are configured to convert the light rays emitted from the image source into a plurality of light beams with different depths of field. Moreover, the micro-lens array makes the whole AR device compact in structure and easy to be worn or carried.
4. The main optical axis of the concave mirror and the main optical axis of the convergent lens intersect at the intersection located on the first semi-transmitting semi-reflecting mirror, so that the light rays emergent from the convergent lens can be reflected as much as possible to the reflection surface of the concave mirror close to the main optical axis, thus improving the image brightness.

In the description of the present disclosure, it needs to be understood that the orientation or position relationships indicated by the terms "center", "up", "down", "front", "back", "left", "right", "vertical", "horizontal", "top", "bottom", "inside", "outside" etc. are based on the orientation or position relationships illustrated in the drawings, intended for the convenience of describing the present disclosure and simplifying the description, rather than indicating or implying that the device or element referred to necessarily has a specific orientation or is constructed and operated in a specific orientation, and therefore, cannot be understood as limitations to the present disclosure.

The terms "first" and "second" are used for descriptive purposes only, and cannot be understood as indicating or implying relative importance or implicitly indicating the number of technical features indicated. Thus, the features defined with "first" and "second" can explicitly or implicitly include one or more of the features. In the description of the present disclosure, unless otherwise stated, "a plurality of" refers to "two or more than two".

In the description of the present disclosure, it should be noted that, unless otherwise specified and defined, the terms "mount", "couple", and "connect" should be understood in a broad sense. For example, it may be a fixed connection, a detachable connection, or an integrated connection; and it may be a direct connection, an indirect connection implemented via an intermediate medium, or an internal communication of two components. For those skilled in the art, the specific meanings of the above terms in the present disclosure can be understood according to specific circumstances.

In the description of the present disclosure, specific characteristics, structures, materials, or features may be combined in an appropriate manner in any one or more embodiments or examples.

Only some of the embodiments of the present disclosure are described above. It should be pointed out that those skilled in the art may make various improvements and modifications without departing from the principle of the present disclosure, which, however, should also be regarded as falling within the scope of protection of the present disclosure.

What is claimed is:

1. An Augmented Reality (AR) optical system, comprising:
   a depth-of-field separation structure (10) corresponding to an image source, the depth-of-field separation structure (10) configured to convert a light ray emitted from the image source into a plurality of light beams with different depths of field;
   a convergent lens (5) located on an emergent light path of the depth-of-field separation structure (10) and configured to receive and shape the plurality of light beams with different depths of field;
   a first semi-transmitting semi-reflecting mirror (7) located on a side of the convergent lens (5) away from the depth-of-field separation structure (10) and configured to reflect the plurality of shaped light beams with different depths of field towards a specified direction; and
   a concave mirror (6) having a preset transmission-reflection ratio and located on a side of the first semi-transmitting semi-reflecting mirror (7) in a reflection emergent light direction, the concave mirror (6) having a concave surface facing the first semi-transmitting semi-reflecting mirror (7) and configured to reflect and converge the plurality of light beams with different depths of field so that the light beams are incident to a specified observation position after passing through the first semi-transmitting semi-reflecting mirror (7),
   wherein a main optical axis of the concave mirror (6) intersects a main optical axis of the convergent lens (5) at the first semi-transmitting semi-reflecting mirror (7).

2. The AR optical system according to claim 1, wherein the depth-of-field separation structure (10) comprises a transmitting-reflecting mirror assembly, the transmitting-reflecting mirror assembly comprising a plurality of semi-transmitting semi-reflecting mirror units having a preset transmission-reflection ratio, the plurality of semi-transmitting semi-reflecting mirror units arranged at intervals for respectively corresponding to image sources with different object distances;
   in the plurality of semi-transmitting semi-reflecting mirror units, emergent light paths of at least a part of the plurality of semi-transmitting semi-reflecting mirror units face an incident light surface of the convergent lens (5); emergent light paths of the other part of the semi-transmitting semi-reflecting mirror units not facing the incident light surface of the convergent lens (5) are transmitted and/or reflected by other semi-transmitting semi-reflecting mirror units except own semi-transmitting semi-reflecting mirror units and then face the incident light surface of the convergent lens; and
   the plurality of semi-transmitting semi-reflecting mirror units are configured to respectively reflect and/or transmit light rays emitted from respective corresponding image sources to form the plurality of light beams with different depths of field incident to the convergent lens (5).

3. The AR optical system according to claim 2, wherein the semi-transmitting semi-reflecting mirror unit closest to the convergent lens (5) is a first semi-transmitting semi-reflecting mirror unit (3), and the semi-transmitting semi-reflecting mirror unit farthest from the convergent lens (5) is a second semi-transmitting semi-reflecting mirror unit (9);
   the semi-transmitting semi-reflecting mirror units located between the first semi-transmitting semi-reflecting mirror unit (3) and the second semi-transmitting semi-reflecting mirror unit (9) are all third semi-transmitting semi-reflecting mirror units (4); the second semi-transmitting semi-reflecting mirror unit (9) is configured to reflect a second light ray of a corresponding second image source (8), such that the second light ray is reflected to the incident light surface of the convergent lens (5) by the first semi-transmitting semi-reflecting mirror unit (3) after passing through the third semi-transmitting semi-reflecting mirror units (4);
   the N-th third semi-transmitting semi-reflecting mirror unit (4) is further configured to reflect a third light ray of a corresponding third image source (2), such that the third light ray is reflected to the incident light surface of the convergent lens (5) by the first semi-transmitting semi-reflecting mirror unit (3), or such that the third light ray is reflected to the incident light surface of the convergent lens (5) by the first semi-transmitting semi-reflecting mirror unit (3) after passing through the (N−1)-th to 1st third semi-transmitting semi-reflecting mirror units (4), wherein N is a positive integer; the third semi-transmitting semi-reflecting mirror unit (4) closest to the first semi-transmitting semi-reflecting mirror unit (3) is the 1st third semi-transmitting semi-reflecting mirror unit (4); and
   the first semi-transmitting semi-reflecting mirror unit (3) is further configured to transmit a first light ray of a corresponding first image source (1) to the incident light surface of the convergent lens (5).

4. The AR optical system according to claim 3, wherein there are three semi-transmitting semi-reflecting mirror units.

5. The AR optical system according to claim 2, wherein the semi-transmitting semi-reflecting mirror unit close to the convergent lens (5) is a first semi-transmitting semi-reflecting mirror unit (3), and the semi-transmitting semi-reflecting mirror unit away from the convergent lens (5) is a second semi-transmitting semi-reflecting mirror unit (9);

the second semi-transmitting semi-reflecting mirror unit (9) is configured to reflect a second light ray of a corresponding second image source (8), such that the second light ray is reflected to the incident light surface of the convergent lens (5) by the first semi-transmitting semi-reflecting mirror unit (3); and the first semi-transmitting semi-reflecting mirror unit (3) is further configured to transmit a first light ray of a corresponding first image source (1) to the incident light surface of the convergent lens (5).

6. The AR optical system according to claim 2, wherein the plurality of semi-transmitting semi-reflecting mirror units are at least one of a plane mirror, a concave mirror, or a convex mirror; and/or the first semi-transmitting semi-reflecting mirror (7) is one of a plane mirror, a concave mirror, or a convex mirror.

7. The AR optical system according to claim 1, wherein the depth-of-field separation structure (10) is a micro-lens array, the micro-lens array arranged in parallel with the convergent lens (5); and the micro-lens array is configured to receive the light ray emitted from the image source and form and emit the plurality of light beams with different depths of field.

8. The AR optical system according to claim 1, wherein the convergent lens (5) at least comprises an aspheric lens; and/or the surface of the convergent lens (5) is coated with an anti-reflection film.

9. An Augmented Reality (AR) display device, comprising an image source and the AR optical system according to claim 1, wherein a depth-of-field separation structure (10) in the AR optical system is disposed in correspondence with the image source.

10. The AR display device according to claim 9, further comprising an optical system frame, wherein the AR optical system is fixed on the optical system frame; and/or the AR optical system and the image source are both fixed on the optical system frame.

\* \* \* \* \*